Patented Aug. 12, 1947

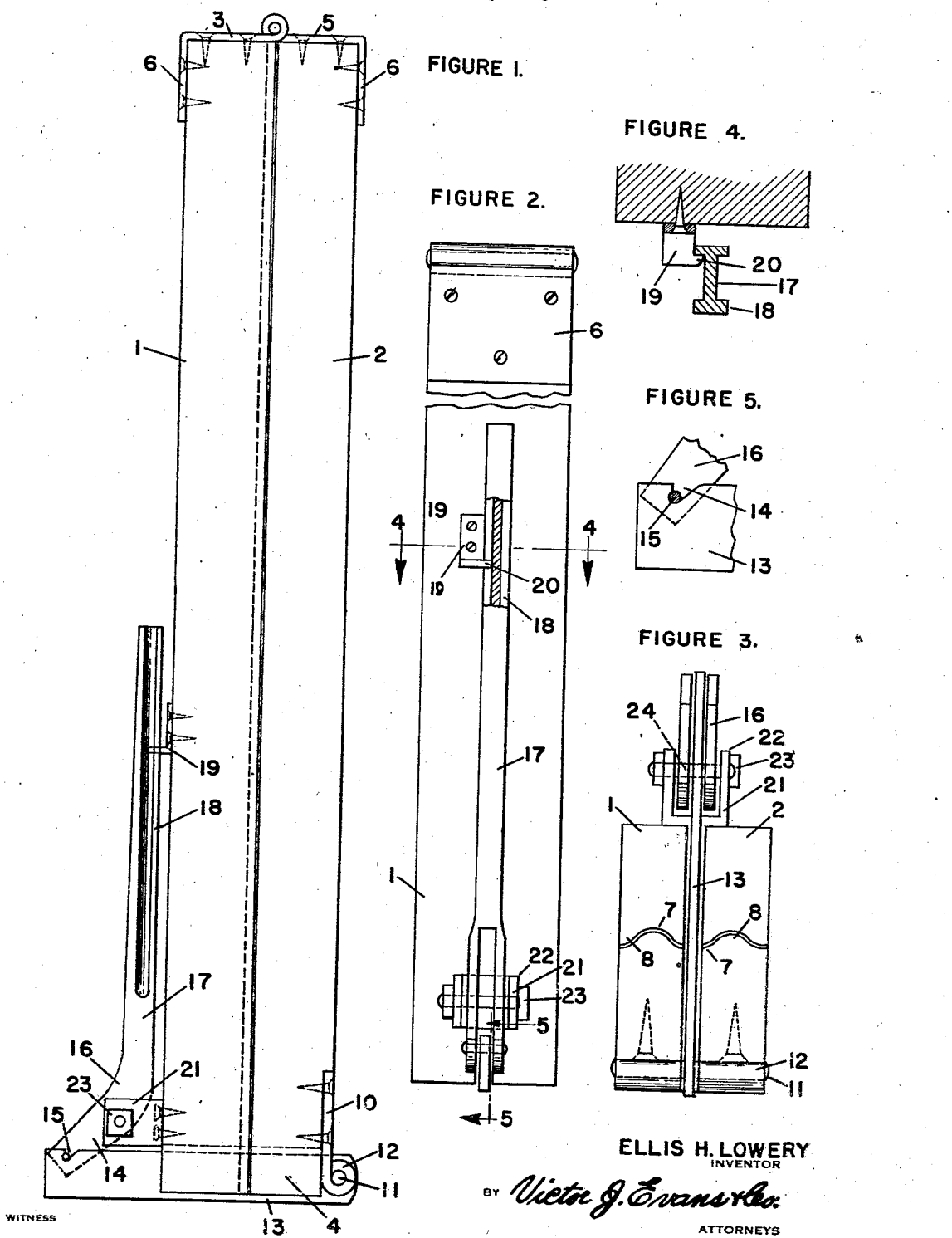

2,425,548

UNITED STATES PATENT OFFICE 2,425,548

WIRE CLAMP FOR STRETCHING WIRE

Ellis H. Lowery, Bernice, La.

Application March 30, 1945, Serial No. 585,775

4 Claims. (Cl. 254—83)

My present invention, in its broad aspect, has reference to improvements in clamps for stretching wide widths of wire, and more particularly, it is my purpose to provide a clamp having hingedly connected sections designed to come together and clamp the end of a wide width of wire, and which sections have quick releasable and attachable holding means at the free ends with an operating lever provided with means for positively holding the sections together in clamping relationship to the wire to be stretched.

Other and equally important objects and advantages of my invention will be apparent from the following description and drawings, and it is to be understood that changes in form, size, shape, materials, and construction and arrangement of parts is permissible and within the purview of my broad inventive concept and the scope of the appended claims.

In the drawings, wherein I have illustrated a preferred form of my invention:

Figure 1 is a side view;

Figure 2 is a top plan view;

Figure 3 is an end view;

Figure 4 is a section on the line 4—4 of Figure 2, and

Figure 5 is a section on the line 5—5 of Figure 2.

In the drawings wherein like characters of reference are used to designate like or similar parts throughout the several views:

The numerals 1 and 2 designate the two elongated similarly formed sections of my wire clamp. These sections are hingedly connected together at one of their ends as at 3, and the other ends are slotted as at 4, such slots registering when the ends are brought together as in Figure 1. The leaves 5 of the hinge 3 have angular end portions 6 to engage about the edges and over the tops of the sections to strengthen the connection therewith. At their meeting faces, the sections 1 and 2 are formed with grooves 7 forming ribs 8. The grooves and ribs register and interfit to hold a section of wire between the sections. At its slotted end, the bottom section 2 has attached thereto a plate 10 formed with spaced bearings 12 to receive a pin 11 on which is pivotally mounted a latching arm 13 which fits in the slots 4 when the sections are brought together as in Figure 1. The free end of the arm 13 is formed with an angled notch 14 to receive the pin 15 mounted between the curved bifurcated end 16 of a pivoted operating lever 17. As shown in Figure 4, the lever 17 has grooved sides to form edge flanges 18, and a latching plate 19 has a finger 20 which fits over a flange 18 to hold the lever against section 1 and the sections 1 and 2 in clamping relationship. A supporting bracket 21 having spaced ears 22 is provided on the section 1 and has a pin 23 which extends through an opening 24 in the lever 17, to pivotally support the same. When the lever is in locking position, the pin 15 fits and is held in the notch 14 and holds the arm 13 in position to clamp the section together, but when released, the lever is raised, the arm moves out and the pin disconnects from notch 14 to release the section. The lever by reason of its shape and the position of its fulcrum exerts a clamping action.

From the foregoing, it is believed that the operation and advantages of my invention will be apparent, but it is again emphasized that interpretation of the scope of my invention should only be conclusive when made in the light of the subjoined claims.

I claim:

1. A wire clamp for stretching wire, comprising a pair of similar sections pivoted together at their ends, and having their opposite ends formed with registering slots, an arm pivoted on the slotted end of one section to fit in the slots and bridge the ends of the sections, and having a notched end, a pivoted operating lever having a pin detachably engageable in the slot in the arm to draw and hold the sections together, and the pin releasable from the slot to release the sections, the meeting faces of the sections having interfitting ribs to engage the wire, edge flanges on said lever and a latching bracket on one of said sections provided with a finger to fit over one of said edge flanges to hold the lever in operative position to hold the sections together about a wire to be stretched.

2. A wire clamp for stretching wire, comprising a pair of similar sections pivoted together at their ends, and having their opposite ends formed with registering slots, an arm pivoted on the slotted end of one section to fit in the slots and bridge the ends of the sections and having a notched end, an operating lever having a curved bifurcated end pivotally mounted on one of the sections, a pin mounted between the arms of the bifurcation for detachable engagement in the notch in the arm to draw and hold the sections together, and the pin releasable from the notch to release the sections, the meeting faces of the sections having interfitting ribs to engage the wire and a latching device to hold the lever in operative position to hold the sections together about wire to be stretched.

3. The invention as in claim 2 wherein the lever is provided with edge flanges and the latching device comprises a bracket having a finger to fit over one of the edge flanges and latch the lever in operative position.

4. The invention as in claim 2 wherein the arm is pivotally mounted on one section and extends beyond the outer face of the opposite section and the notch therein is angular in relation to the plane of said opposite section, the sections are hingedly connected together, and the hinge has leaves fitting about the corners and over the tops of the sections to securely hold the sections together and a pivotal bracket is provided for the lever having spaced arms carrying a pivot pin on which the lever is mounted.

ELLIS H. LOWERY.

REFERENCES CITED

The following references are of record in the file of this patent:

UNITED STATES PATENTS

| Number | Name | Date |
| --- | --- | --- |
| 341,365 | Wilson | May 4, 1886 |
| 995,298 | Sims | June 13, 1911 |
| 1,231,068 | Saylor | June 26, 1917 |
| 1,951,064 | Richards et al. | Mar. 13, 1934 |
| 2,377,953 | Matton | June 12, 1945 |
| 1,435,508 | Spalding | Nov. 14, 1922 |
| 657,128 | McClosky | Sept. 4, 1900 |